US007674760B2

(12) United States Patent
Hei et al.

(10) Patent No.: US 7,674,760 B2
(45) Date of Patent: Mar. 9, 2010

(54) FLOOR STRIPPER/CLEANER CONTAINING ORGANIC ACID-BASE PAIR

(75) Inventors: Robert D. P. Hei, Baldwin, WI (US); Brian R. Leafblad, Saint Paul, MN (US); Minyu Li, Oakdale, MN (US); Lauren K. Carlson, Saint Paul, MN (US); Nicola Kriens, Bochum (DE); Christian Franz Liko, Schernbeck (DE)

(73) Assignee: Ecolab Inc., St. Paul, MN (US)

( * ) Notice: Subject to any disclaimer, the term of this patent is extended or adjusted under 35 U.S.C. 154(b) by 501 days.

(21) Appl. No.: 11/254,233

(22) Filed: Oct. 18, 2005

(65) Prior Publication Data

US 2007/0095003 A1    May 3, 2007

(51) Int. Cl.
*C11D 3/144* (2006.01)

(52) U.S. Cl. .................. 510/435; 510/161; 510/212; 510/217; 510/245; 510/405; 134/38

(58) Field of Classification Search ........... 510/161, 510/201, 212, 217, 245, 505, 506; 134/38
See application file for complete search history.

(56) References Cited

U.S. PATENT DOCUMENTS

| 3,993,804 | A | | 11/1976 | McReady et al. |
|---|---|---|---|---|
| 4,077,896 | A | * | 3/1978 | Bunegar et al. .............. 510/214 |
| 4,187,191 | A | | 2/1980 | Simpson, Jr. |
| 4,221,674 | A | * | 9/1980 | Vander Mey ................. 510/176 |
| 4,517,330 | A | | 5/1985 | Zdanowski et al. |
| 4,999,216 | A | | 3/1991 | Gaski et al. |
| 5,080,831 | A | | 1/1992 | VanEenam |
| 5,091,211 | A | | 2/1992 | Richard |
| 5,096,610 | A | | 3/1992 | Bingham |
| 5,319,018 | A | | 6/1994 | Owens et al. |
| 5,342,551 | A | | 8/1994 | Ruckle |
| 5,419,848 | A | | 5/1995 | VanEenam |
| 5,453,451 | A | | 9/1995 | Sokol |
| 5,637,559 | A | | 6/1997 | Koretz et al. |
| 5,728,666 | A | | 3/1998 | Vitomar |
| 5,744,440 | A | | 4/1998 | Liu |
| 5,773,487 | A | | 6/1998 | Sokol |
| 5,783,538 | A | | 7/1998 | Totoki |
| 5,830,937 | A | | 11/1998 | Shalov et al. |
| 5,849,682 | A | | 12/1998 | VanEenam |
| 5,851,972 | A | | 12/1998 | Distaso et al. |
| 5,977,042 | A | * | 11/1999 | Hernandez et al. .......... 510/201 |
| 6,096,383 | A | | 8/2000 | Berg et al. |
| 6,197,844 | B1 | | 3/2001 | Hamrock et al. |
| 6,228,433 | B1 | | 5/2001 | Witt |
| 6,316,535 | B1 | | 11/2001 | Caldwell et al. |
| 6,465,405 | B1 | | 10/2002 | Vitomar |
| 6,544,942 | B1 | * | 4/2003 | Smith et al. ................. 510/417 |
| 6,583,101 | B1 | | 6/2003 | Wiseth et al. |
| 6,586,380 | B2 | | 7/2003 | Marquis et al. |
| 6,824,623 | B1 | * | 11/2004 | Gross et al. .................... 134/36 |
| 2002/0028621 | A1 | | 3/2002 | Levitt et al. |
| 2003/0031801 | A1 | | 2/2003 | Olson et al. |
| 2003/0125226 | A1 | | 7/2003 | Lewis |
| 2004/0121932 | A1 | | 6/2004 | Griese et al. |
| 2005/0130869 | A1 | | 6/2005 | Gross et al. |

FOREIGN PATENT DOCUMENTS

| WO | WO 98/17734 | | 4/1998 |
|---|---|---|---|
| WO | WO 2004/090085 | A1 | 10/2004 |
| WO | WO 2006/113144 | A1 | 10/2006 |

* cited by examiner

*Primary Examiner*—Mark Eashoo
*Assistant Examiner*—M. Reza Asdjodi
(74) *Attorney, Agent, or Firm*—Andrew D. Sorensen; Amy J. Hoffman

(57) ABSTRACT

Floor finishes are stripped or deep scrubbed using a floor stripper/cleaner composition containing sparingly water-soluble floor finish solvent; water; sulfonic acid, sulfate acid, phosphonic acid, phosphate acid or aromatic acid coupler in an amount sufficient to provide a homogenous aqueous liquid phase and no or low foaming during shaking; and sufficient organic amine so that the composition pH is about 2 to about 11.

22 Claims, No Drawings

FLOOR STRIPPER/CLEANER CONTAINING ORGANIC ACID-BASE PAIR

TECHNICAL FIELD

This invention relates to floor stripping, to the non-destructive removal of floor finishes, and to floor finish scrub and recoat procedures.

BACKGROUND

Floor strippers are used to remove worn or discolored floor finishes from flooring substrates (e.g., vinyl composition tiles) so that a new finish may be applied. Floor scrub and recoat materials are used to carry out a procedure sometimes referred to as "deep scrubbing" so that a fresh layer of floor finish may be applied atop an existing floor finish. References relating to various stripping or cleaning agents (some of which are said to be floor strippers or floor cleaners) include U.S. Pat. No. 3,993,804 (McReady et al.) U.S. Pat. No. 4,187,191 (Simpson, Jr.), U.S. Pat. No. 5,080,831 (VanEenam '831), U.S. Pat. No. 5,342,551 (Ruckle), U.S. Pat. No. 5,419,848 (VanEenam '848), U.S. Pat. No. 5,637,559 (Koreltz et al.), U.S. Pat. No. 5,728,666 (Vitomar '666), U.S. Pat. No. 5,744,440 (Liu), U.S. Pat. No. 5,849,682 (VanEenam '682), U.S. Pat. No. 5,851,972 (Distaso et al.), U.S. Pat. No. 6,465,405 B1 (Vitomar '405), U.S. Pat. No. 6,544,942 B1 (Smith et al.), U.S. Pat. No. 6,583,101 B1 (Wiseth et al.) and U.S. Pat. No. 6,586,380 B2 (Marquis et al.), U.S. Patent Application Publication No. US 2003/0125226 A1 (Lewis), Published PCT Application Nos. WO 98/17734 (Brent International PLC) and WO 2004/090085 A1 (Vocfree, Inc.), Henkel Surface Technologies Technical Process Bulletin No. 238828 (Form Revised 4 Jun. 2001) and *Benzyl Alcohol Paint Stripping*, available on the Internet at http://p2library.nfesc.navy.mil/P2 Opportunity Handbook/5_9.html (Revision Date 8/03).

SUMMARY OF THE INVENTION

Many floor strippers and floor scrub and recoat materials have a high pH, may irritate a user's skin, or may stain or otherwise damage linoleum and other substrates. Some strippers or scrub and recoat materials "dewet" (appear to bead up upon or otherwise insufficiently wet) a floor shortly after being applied, and may continue to dewet until the user swabs the applied material back and forth a few times. Some floor finishes (e.g., crosslinked floor finishes) are especially difficult to remove and may require multiple applications of a floor stripper formulation or long dwell times.

The present invention provides, in one aspect, a floor finish stripper or scrub and recoat composition comprising:
 a) sparingly water-soluble floor finish solvent;
 b) water;
 c) sulfonic acid, sulfate acid, phosphonic acid, phosphate acid or aromatic acid coupler in an amount sufficient to provide a homogenous aqueous liquid phase and no or low foaming during shaking; and
 d) sufficient organic amine so that the composition pH is about 2 to about 11.

The invention provides in another aspect a method for stripping or deep scrubbing a floor finish comprising:
 a) applying to the floor finish a composition comprising sparingly water-soluble floor finish solvent; water; sulfonic acid, sulfate acid, phosphonic acid, phosphate acid or aromatic acid coupler in an amount sufficient to provide a homogenous aqueous liquid phase and no or low foaming during shaking; and sufficient organic amine so that the composition pH is about 2 to about 11;
 b) allowing the applied composition to soften, dissolve or clean the floor finish; and
 c) removing the composition.

The disclosed compositions and methods facilitate stripping or cleaning floor finishes. Preferred embodiments of the disclosed compositions and methods have a reduced pH and may be less irritating to skin or less likely to stain substrates such as linoleum. Additional preferred embodiments of the disclosed compositions and methods are substantially free of inorganic salts, and may be "greener" or more environmentally friendly than conventional compositions containing salts of acids as couplers.

DETAILED DESCRIPTION

The phrase "hardenable floor finish" refers to an applied liquid coating that through a chemical or physical process (including solvent evaporation or other drying processes, photochemical reactions, electrochemical reactions, radical processes, thermal processes, ionic processes, moisture cure processes or multiple-component (e.g., two- or three-component) crosslinking processes) can become dried, crosslinked or otherwise cured in situ to form a tack-free film on a floor. The phrase "hardened floor finish" refers to such a dried, cross-linked or otherwise cured floor finish.

The phrase "stripping a floor finish" refers to removing, at such time as it may be desired to do so, a hardened floor finish from an underlying installed flooring substrate without removing substantial portions of the flooring substrate. Such stripping preferably employs minimally abrasive measures such as mop or spray application of the disclosed stripper followed after a brief standing time by rinsing using, e.g., water or a detergent solution. Stripping may if desired be accompanied by more abrasive but flooring-safe measures such as abrading the finish during the standing time using, e.g., a nonwoven floor scrub pad, but may be carried out without requiring a flooring-damaging finish removal step such as sanding.

The phrases "deep scrubbing" and "scrubbing and recoating" refer to applying, at such time as it may be desired to do so, a composition containing a floor finish solvent to a hardened floor finish atop an underlying installed flooring substrate without removing all of the hardened floor finish, and cleaning the hardened floor finish surface sufficiently so that an additional layer or layers of hardenable floor finish may be applied thereto and hardened.

The word "concentrate" refers to a composition intended to be diluted with water before use. The phrase "substantially nonchlorinated" refers to a concentrate that does not contain objectionable quantities of chlorinated solvents (e.g., methylene chloride) whose presence might pose a health or environmental hazard. The phrase "floor finish solvent" refers to an organic liquid that can dissolve, soften or otherwise assist in removing a hardened floor finish from a floor, and includes organic cosolvents that assist in dissolving a solvent in a concentrate, help maintain the concentrate in a desirable physical state during storage, ease dilution of the concentrate with water, reduce cost, reduce odor or provide some other desirable packaging, storage or use benefit. The phrase "sparingly water-soluble" refers to a material that when mixed by itself with water at room temperature and pressure at a mixing ratio less than 1:20 will not form a clear, homogenous solution but which can form a clear, homogenous solution in the presence of sufficient acidic coupler.

The phrase "not corrosive to skin" refers to a composition which when tested with the CORROSITEX™ in-vitro skin corrosion assay from InVitro International does not break through the assay membrane in less than sixty minutes of contact.

The phrase "homogenous aqueous liquid phase and no or low foaming during shaking" refers to a composition that contains or is diluted to contain at least 75 wt. % water and which when 7.5 ml of such composition or diluted composition is placed in a 50 ml Erlenmeyer flask, manually shaken for one minute and allowed to stand for one minute will not completely separate into two or more phases and will not exhibit more than 10 ml of visible foam.

A variety of sparingly water-soluble floor finish solvents may be employed in the disclosed compositions and methods. The solvent desirably has a flash point greater than about 60° C., low odor and low toxicity, and preferably has at least 0.1 wt. % water solubility. Representative floor finish solvents include 2-, 3- or 4-acetamidophenol (<1.4% water solubility); acetanilide (<1% water solubility); acetophenone (<1% water solubility); 2-acetyl-1-methylpyrrole; benzyl acetate (<1% water solubility); benzyl alcohol (~-4% water solubility); benzyl benzoate (<1% water solubility); benzyloxyethanol (<1% water solubility); ethers or hydroxyethers such as ethylene glycol phenyl ether (2.3% water solubility, commercially available as DOWANOL EPh™ from Dow Chemical Co.) and propylene glycol phenyl ether (1.1% water solubility, commercially available as DOWANOL PPh™ from Dow Chemical Co.); essential oils (e.g., benzaldehyde, pinenes (alphas, betas, etc.), terpineols, terpinenes, carvone, cinnamealdehyde, borneol and its esters, citrals, ionenes, jasmine oil, limonene, dipentene, linalool and its esters); dibasic esters such as dimethyl adipate, dimethyl succinate, dimethyl glutarate (often available in a mixture, including products available under the trade designations DBE™, DBE-3, DBE-4, DBE-5, DBE-6, DBE-9, DBE-IB, and DBE-ME from DuPont Nylon), dimethyl malonate, diethyl adipate, diethyl succinate, diethyl glutarate, dibutyl succinate, and dibutyl glutarate; dialkyl carbonates such as dimethyl carbonate, diethyl carbonate, dipropyl carbonate, diisopropyl carbonate, and dibutyl carbonate; $C_{1-12}$ organic anhydrides such as acetic anhydride, succinic anhydride, phthalic anhydride, maleic anhydride, and alkyl or alkenyl succinic anhydrides; organonitriles such as acetonitrile and benzonitrile; organo-phosphates and phosphonates such as tributyl phosphate, tripropyl phosphate, 2-ethyl-1-hexyl phosphate; phthalate esters such as dibutyl phthalate, diethylhexyl phthalate, and diethyl phthalate; and mixtures thereof. The water solubilities noted above are room temperature values. Some materials may serve as a solvent in some floor stripper/cleaner solutions or in some stripping applications, and as a cosolvent in combination with one or more solvents in other floor stripper/cleaner solutions or in other stripping applications. Additional representative solvents include amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL™ acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE™ acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL™ from Dow Chemical Co.), ethyl 3-ethoxypropionate (commercially available as UCAR™ Ester EEP from Dow Chemical Co.), 2,2,4-Trimethyl-1,3-Pentanediol Monoisobutyrate (commercially available as UCAR FILMER™ IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Preferred floor finish solvents include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof. The floor finish solvent(s) (including cosolvent(s), if employed), may collectively represent for example at least 20%, at least 30%, at least 40%, at least 50%, at least 60%, at least 70%, at least 80% or at least 90% of the total concentrate weight.

Tap water, deionized water, distilled water or water in any other suitable form may be used in the disclosed compositions and methods. The use of softened water or of water having a low overall hardness level may facilitate application of the disclosed compositions to a hardened floor finish and limit dewetting. When the disclosed compositions are formulated as a concentrate, water may represent for example at least 5%, at least 10%, at least 20%, at least 30%, at least 40%, at least 50%, at least 60%, at least 70% or at least 80% of the total concentrate weight.

A variety of sulfonic acid, sulfate acid, phosphonic acid, phosphate acid and aromatic acid couplers may be employed in the disclosed compositions and methods. The acid coupler may contain carbon atoms, (e.g., from about 2 to about 11 carbon atoms), may contain heteroatoms (e.g., nitrogen or sulfur) and may be substituted with various moieties (e.g., hydroxyl, ester, aldehyde or alkyl groups), so long as such carbon atoms, heteroatoms and moieties do not interfere with solubilization of the floor finish solvent or cause excessive foaming during shaking. As shown below in Examples 16 and 17, when a linear alkylbenzene sulfonic acid such as dodecylbenzene sulfonic acid is used as the acid, agitation can lead to excessive foam formation. If a stripper/cleaner prone to such excessive foam formation is applied using a swing machine or other motorized application device, the foam can cause pump cavitation and otherwise slow the removal process when using an autoscrubber or other suction device to remove the residual stripper/cleaner and softened or stripped finish.

Exemplary acid couplers include hydroxyethane sulfonic acid, cumene sulfonic acid, toluene sulfonic acid, xylene sulfonic acid, methyl naphthalene sulfonic acid, amino tri (methylene phosphonic acid), 1-hydroxyethylidene-1,1-diphosphonic acid, n-butyl acid phosphate, phenyl acid phosphate, dimethylpyrophosphoric acid, 2-phosphonobutane-1,2,4-tricarboxylic acid, benzoic acid, hydroxybenzoic acids (e.g., 2-hydroxybenzoic acid), dihydroxybenzoic acids (e.g., 3,5-dihydroxybenzoic acid), pyridinecarboxylic acids (e.g., 2-pyridinecarboxylic acid) pyridinedicarboxylic acids (e.g., 2,6-pyridinedicarboxylic acid) and sulfosuccinic acid. The acid coupler may have any suitable purity level. Preferably however an acid coupler of at least 50% purity is employed. When the disclosed compositions are formulated as a concentrate, the acid coupler may represent for example about 0.1 to about 20%, about 0.1 to about 10% or about 0.1 to about 5% of the total concentrate weight. The acid coupler may be accompanied by other acids (e.g., mineral acids) or by salts of aromatic, aliphatic or mineral acids (e.g., sodium benzene sulfonate). However, the inclusion of such other acids or acid salts may make the stripper/cleaner less environmentally friendly. Preferably the acid coupler is at least 50% of the total weight of acids and salts of acids in the disclosed compositions. Acid couplers as described in copending application Ser. No. 11/254,235 filed even date herewith, the disclosure of which is incorporated herein by reference, may also be employed in the disclosed compositions and methods.

A variety of organic amines may be employed in the disclosed compositions and methods. Representative organic amines include low molecular weight (e.g., $C_{1-12}$) organoamines and substituted organoamines (e.g., alkanolamines) such as monoethanolamine, diethyl ethanolamine, triethanolamine, 1,2-diaminoethane, 1,2-diaminopropane, N-benzylethanolamine, 2-aminomethylpropanol, furfurylamine, tetrahydrofurfurylamine and mixtures thereof. When the disclosed compositions are formulated as a concentrate, the organic amine may represent for example about 0.1 to about 20%, about 0.1 to about 10% or about 0.1 to about 5% of the total concentrate weight. The amine amount may also be expressed in terms of the molar equivalent ratio of acid to amine. For example, acid:amine molar equivalent ratios of about 0.7:1 to about 1.3:1 may be employed. Often it will be desirable to adjust the amine amount to obtain a desired pH in the final concentrate or use-solution. For example, the pH may be about 2 to about 11, about 4 to about 10, or about 5 to about 9. The use of excessive amine in the floor stripper/cleaner concentrate or use-solution can make the composition corrosive to skin, and can subject a concentrate having such corrosive properties to much more stringent packaging requirements. The organoamine may be accompanied by other amines (e.g., inorganic amines) or by salts of organic of inorganic amines. However, the inclusion of amine salts may make the stripper/cleaner less environmentally friendly, and the inclusion of inorganic amines may make the composition more prone to dewetting. Preferably the organoamines are at least 50% of the total weight of amines and salts of amines.

The disclosed compositions may also contain one or more surfactants. Representative surfactants will be familiar to those skilled in the art, and include anionic, cationic, amphoteric and nonionic surfactants, and mixtures thereof. Exemplary surfactants are described in U.S. Pat. No. 6,544,942 B1. The amount of surfactant may vary depending on factors such as the types and amounts of other ingredients in the disclosed composition, the desired dilution level, and other factors that will be familiar to those skilled in the art. As a general guide, the amount of surfactant may be about 0.1 to about 20%, about 0.1 to about 15% or about 0.1 to about 10% of the total concentrate weight.

The disclosed compositions may contain other adjuvants including biocides, abrasive particles, chelants, builders, defoamers, fragrances, dyes, indicators, colorants, thickeners, anticorrosion additives, antirust additives, light stabilizers and antioxidants. The types and amounts of such adjuvants will be apparent to those skilled in the art.

The disclosed stripper/cleaners may be manufactured as water-containing concentrates intended to be diluted with additional water prior to use, or as ready-to-use aqueous solutions that may be employed without dilution. Desirably the floor stripper/cleaner forms a single phase when freshly stirred and maintains that single phase while stored in the container in which it will be sold, or at least for sufficient time (e.g., for one minute or more, two minutes or more, or five minutes or more) so that the composition may be stirred or otherwise mixed and then applied to a floor at the intended point of use before phase separation occurs. The concentrate may contain for example about 5 to about 85 wt. % solvent, about 1 to about 93 wt. % water, about 1 to about 25 wt. % acid coupler and about 1 to about 25 wt. % organic amine. A ready-to-use solution may contain for example about 0.05 to about 25 wt. % solvent, about 25 to about 99 wt. % water, about 0.1 to about 10 wt. % acid coupler and about 0.1 to about 10 wt. % organic amine. The disclosed stripper/cleaners may be manufactured by mixing the ingredients in any convenient order. For example, the water, organic amine, surfactant (if employed), floor finish solvent, acid and any other desired ingredients (e.g., dyes, fragrances, chelating agents, etc.) may be mixed together. The disclosed stripper/cleaners may be packaged in any convenient form including bottles, drums, dispensers intended to be carried by a user during stripper/cleaner application and dispensers intended to be replaceably installed in a mixing or dispensing device (e.g., a wall-mounted, freestanding or benchtop dispensing station). The types and design of suitable packaging will be familiar to those skilled in the art.

A variety of flooring substrates may be stripped using the disclosed method. Exemplary flooring substrates include resilient flooring substrates such as vinyl composition tiles, vinyl sheet flooring, linoleum, rubber sheeting, rubber tile, cork, synthetic sports flooring and vinyl asbestos tile, and non-resilient flooring substrates such as terrazzo, concrete, wood flooring, bamboo, wood laminate, engineered wood products (e.g. wood epoxy blends, permanently coated substrates such as those available under the names PERGO™ and PARQUET™), stone, marble, slate, ceramic tile, grout, and dry shake flooring. Such flooring substrates may be installed at a variety of jobsites, including indoor and outdoor sites involving new or existing residential, commercial and government- or agency-owned sites.

A variety of hardened floor finishes may be stripped or deep scrubbed using the disclosed method. Representative commercially available floor finishes include PADLOCK™, GEMSTAR LASER™, GEMSTAR POLARIS™, RIVET™, and TAJ MAHAL™ acrylic floor finishes, GLOSSTEK 100™ and ORION™ polyurethane floor finishes, and COURTMASTER II™, ISI STAR™, TUKLAR MEDICAL™ floor finishes, all from Ecolab Inc.; CORNERSTONE™ and TOPLINE™ acrylic floor finishes from 3M; BETCO BEST™ floor finish from Betco Corp.; HIGH NOON™ acrylic finish from Butchers; CITATION™ and CASTLEGUARD™ acrylic finishes from Buckeye International, Inc., COMPLETE™, SIGNATURE™, TECHNIQUE™ and VECTRA™ acrylic floor finishes from SC Johnson Professional Products; OVER AND UNDER™ floor sealer from S. C. Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; ACRYL-KOTE™ Seal and Finish and PREP Floor Seal from Minuteman, International, Inc.; ULTRA TC™ and UV I-FINISH™ UV-curable finishes from Minuteman, International, Inc; FLOORSTAR™ Premium 25 floor finish from ServiceMaster, Inc.; and UPPER LIMITS™ acrylic finish and ISHINE™ optically brightened floor finish from Spartan Chemical Co. Other suitable floor finishes may be based on film formers including No. AD200C1 polyester polyurethane formulation from Air Products and Chemicals, Inc.; LAROMER™ PE 22 WN polyester acrylate emulsion, LAROMER LR 8949 aqueous radiation curable aliphatic polyurethane dispersion and LAROMER LR 8983 aqueous radiation curable aromatic polyurethane dispersion, all from BASF Corp.; No. MG98-040 polyester polyurethane formulation from Bayer AG; MEGATRAN™ 205 zinc crosslinked acrylic dispersion and SYNTRAN™ 1580 zinc crosslinked acrylic dispersion from Interpolymer Corp.; MORGLO™ zinc crosslinked acrylic dispersion and MORGLO2™ acrylic styrene polymer emulsion, both from Omnova Solutions Inc.; STAY-CLAD™ 5900 hydroxyl-functional acrylic polymer dispersion from Reichhold, Inc.; DURAPLUS™ 2 modified acrylic low odor mixed-metal crosslinked polymer, DURAPLUS 3 zinc crosslinked acrylic dispersion, DURAGREEN™ MF1 metal free acrylic polymer emulsion, PRIMAL™ B-336AFK modified acrylic zinc crosslinked polymer, PRIMAL B-924ER zinc crosslinked, all acrylic polymer emulsion, PRIMAL E-2483 metal crosslinked acrylic polymer, PRIMAL E-3188 waterborne acrylic polymer dispersion, PRIMAL NT-2624 metal-free polymer, PRIMAL NT-6035 metal-free polymer, RHOPLEX™ B-924 all-acrylic metal-crosslinked floor polish polymer, RHOPLEX 1421 zinc crosslinked acrylic dispersion, RHOPLEX B-1604 metal-crosslinked modified acrylic polymer, RHOPLEX NT-2624 metal crosslinker-free modified acrylic polish, RHOPLEX 3479 low foaming metal-crosslinked modified acrylic polymer, ROSHIELD™ 3120 UV curable acrylate coating and UHS Plus™ metal-crosslinked modified acrylic polymer, all from Rohm & Haas Co.; VIAKTIN™ VTE 6155 aliphatic urethane acrylate, VTE 6165 aromatic urethane acrylate and VTE 6169 aliphatic polyester urethane radiation curing resins, all from Solutia, Inc.; Nos. 979-1 and 980-3 polyester polyurethane formulations from U.S. Polymers, Inc.; the ZVOC™ series of UV curable coatings from UV Coatings Limited; No. G-2029 acrylic polyurethane formulation and NEORAD™ NR-3709 UV curable aliphatic urethane coating from Zeneca Resins; 98-283W urethane acrylate from Hans Rahn & Co.; and materials such as those described in U.S. Pat. Nos. 4,517,330, 4,999,216, 5,091,211, 5,319,018, 5,453,451, 5,773,487, 5,830,937, 6,096,383, 6,197,844, 6,228,433, 6,316,535 B1, 6,544,942 B1, U.S. Patent Application Publication No. US 2002/0028621 A1, and in the patents cited therein. The floor finishes may include water-soluble or water-dispersible film formers such as metal-free acrylic finishes, acid-containing polymers crosslinked using transition metals, and water-soluble or water-dispersible multicomponent (e.g., two component) polyurethanes. The floor finish may contain mixtures of film formers.

If in concentrated form, the stripper/cleaner should be diluted with water prior to use, e.g., at an intended use location. Ordinary tap water, softened water or process water may be employed. The concentrate:water dilution ratio usually will be at least 1:1 by volume, for example at least 1:2, at least 1:3, at least 1:4, at least 1:5, at least 1:6, at least 1:8, at least 1:10 or more. A variety of mixing methods may be employed. Mixing in a mop bucket is one such method and may be preferred. The hardened floor finish can optionally be abraded with a suitably mild abrasive (e.g., a green or black SCOTCH-BRITE™ Floor Maintenance pad from 3M) prior to applying the stripper/cleaner. The stripper/cleaner may be applied using techniques that will be familiar to those skilled in the art (e.g., using a flat or string mop, squeegee, roller or towel). The applied stripper/cleaner should be allowed to stand for a suitable time (e.g., for a minute or more, and typically up to about 5, up to about 10 or up to about 20 minutes) while it softens or deep scrubs the floor finish. The composition (and, where stripping is intended, the softened finish) may be removed using a variety of techniques that will be familiar to those skilled in the art including vacuuming, mopping, scrubbing or wiping. The stripped floor or deep scrubbed floor finish may be allowed to dry and a layer or layers of floor finish applied thereto and caused or allowed to harden.

The invention is further illustrated in the following non-limiting examples, in which all parts and percentages are by weight unless otherwise indicated.

Example 1

A concentrate was made using the ingredients and weight percentage amounts shown below in Table 1. Monoethanolamine, benzyl alcohol, surfactant and ethylene glycol n-butyl ether were all added with stirring to the majority of the water. The mixture formed two phases. Cumene sulfonic acid was added with stirring until the mixture formed a single-phase concentrate, followed by addition of the remaining water.

TABLE 1

| Ingredient | Amount, % |
| --- | --- |
| Water | 42.0 |
| Monoethanolamine | 2.1 |
| Benzyl alcohol | 39.0 |
| $C_{12}$-$C_{18}$ fatty alcohol ethoxylate[1] | 0.3 |
| Ethylene glycol n-butyl ether[2] | 9.0 |
| Cumene sulfonic acid | 7.6 |

[1]LUTENSOL ™ A4N surfactant from BASF AG.
[2]Butyl CELLOSOLVE ™ from Dow Chemical Co.

The resulting concentrate was diluted with tap water at a 1:3 ratio by volume to form a floor stripper/cleaner use-solution having a pH of about 2 as measured using pH strips. The use-solution was clear when mixed and initially remained clear after mixing, but if allowed to stand for about 2-3 minutes exhibited pseudo-stability and separated into two phases. The floor stripper/cleaner was remixed to reform a single-phase use-solution and used to strip a vinyl composite tile coated with 2 coats of aziridine crosslinked TUKLAR MEDICAL™ floor finish (from Ecolab Inc.) which had been applied at a 50 m²/L (2000 ft²/gallon) coating rate. The use-solution applied easily, and did not appear to dewet. The applied use-solution was allowed to stand for a 10 or 20 minute contact time, then scrubbed by hand using a green SCOTCHBRITE™ pad (from 3M Co.) and rinsed with water. All coats of the finish were completely removed after either a 10 or 20 minute contact time.

Example 2

Ready-to-use pH 2 and pH 6 versions of the Example 1 floor stripper/cleaner were made by mixing together the ingredients in the percentage amounts shown below in Table 2.

TABLE 2

| Ingredient | Run 2-1, % | Run 2-2, % |
| --- | --- | --- |
| Water | 85.5 | 85.4 |
| Monoethanolamine | 0.525 | 0.625 |

TABLE 2-continued

| Ingredient | Run 2-1, % | Run 2-2, % |
| --- | --- | --- |
| Benzyl alcohol | 9.75 | 9.75 |
| $C_{12}$-$C_{18}$ fatty alcohol ethoxylate | 0.075 | 0.075 |
| Ethylene glycol n-butyl ether | 2.25 | 2.25 |
| Cumene sulfonic acid | 1.9 | 1.9 |

The resulting stripper/cleaners were used to strip tiles coated as in Example 1 with 2 layers of crosslinked floor finish. Foam rings were adhered to the tiles to provide four similar enclosed circular areas. The Run 2-1 and 2-2 stripper/cleaners were placed inside the rings for 10 minute or 20 minute contact times. The foam rings were removed and the tiles scrubbed by hand with a green SCOTCHBRITE pad and rinsed with water. The Run 2-1 and 2-2 stripper/cleaners were also spread using a flocked pad on 76 mm×76 mm square areas of another similarly-coated tile, allowed to stand for 10 minute or 20 minute contact times, then scrubbed by hand with a green SCOTCHBRITE pad and rinsed with water. For both the foam ring and coated square area tests, the Run 2-1 floor stripper/cleaner removed more finish than did the Run 2-2 floor stripper/cleaner. For the coated square area test, the Run 2-2 floor stripper/cleaner wet the tile surface better than did the Run 2-1 floor stripper/cleaner.

Example 3

Concentrated versions of the Run 2-1 and Run 2-2 stripper/cleaners, and a higher pH (approximately pH 9) concentrate were made by mixing together the ingredients in the percentage amounts shown below in Table 3.

TABLE 3

| Ingredient | Run 3-1, % | Run 3-2, % | Run 3-3, % |
| --- | --- | --- | --- |
| Water | 42.0 | 41.6 | 40.0 |
| Monoethanolamine | 2.1 | 2.5 | 4.1 |
| Benzyl alcohol | 39.0 | 39.0 | 39.0 |
| $C_{12}$-$C_{18}$ fatty alcohol ethoxylate | 0.3 | 0.3 | 0.3 |
| Ethylene glycol n-butyl ether | 9.0 | 9.0 | 9.0 |
| Cumene sulfonic acid | 7.6 | 7.6 | 7.6 |

Using a variety of applicators, a vinyl-tiled hallway area was coated with 3 basecoats of PADLOCK™ finish from Ecolab Inc. applied at a 50 m²/L (2000 ft²/gallon) coating rate and overcoated with ORION™ two-part urethane topcoat from Ecolab Inc. applied at a 15 m²/L (600 ft²/gallon) coating rate. Each of the concentrates shown above in Table 3 was mixed with water at a 1:3 by volume dilution ratio, applied to a section of the hallway and allowed to stand for 15 minutes, scrubbed using a swing machine equipped with a 3M HI PRO™ black nonwoven pad, then successfully removed using an autoscrubber. All three stripper/cleaners completely removed 100% of the multilayer finish with no dewetting and minimal foam formation.

Example 4

Acidic (Run 4-1) and basic (Run 4-2) concentrates were made by mixing together the ingredients in the percentage amounts shown below in Table 4.

TABLE 4

| Ingredient | Run 4-1, % | Run 4-2, % |
| --- | --- | --- |
| Water | 30.4 | 22.18 |
| Monoethanolamine | 2.1 | 10.32 |

TABLE 4-continued

| Ingredient | Run 4-1, % | Run 4-2, % |
| --- | --- | --- |
| Benzyl alcohol | 39.0 | 39.0 |
| $C_{12}$-$C_{18}$ fatty alcohol ethoxylate | 0.3 | 0.3 |
| Ethylene glycol n-butyl ether | 9.0 | 9.0 |
| Cumene sulfonic acid | 19.2 | 19.2 |

The resulting floor stripper/cleaner concentrates were mixed with water at a 1:3 by volume dilution ratio to provide use-solutions which retained a single phase and did not phase separate when allowed to stand. The use-solutions were used to strip tiles coated as in Example 1 with 2 layers of crosslinked floor finish, by distributing approximately 4 milliliters of use-solution on a 10 cm×30 cm tile section using a flocked pad. Wetting was evaluated after a 30 second contact time. After a 4 minute contact time, an additional 4 milliliters of use-solution was similarly applied. After a 10 minute total contact time, each tile section was hand-scrubbed using a green SCOTCHBRITE pad and rinsed with water. Both stripper/cleaners effectively stripped the finish, with the Run 4-1 floor stripper/cleaner appearing to work more quickly and slightly more effectively. No dewetting was observed.

Example 5

A series of concentrates containing different monoethanolamine (MEA):cumene sulfonic acid (CSA) molar ratios was made by mixing together the ingredients in the percentage amounts shown below in Table 5a.

TABLE 5a

| Ingredient | Run 5-1, % | Run 5-2, % | Run 5-3, % |
| --- | --- | --- | --- |
| Water | 36.09 | 37.25 | 38.17 |
| Monoethanolamine | 6.96 | 5.80 | 4.88 |
| Cumene sulfonic acid | 15.12 | 15.12 | 15.12 |
| Benzyl alcohol | 27.0 | 27.0 | 27.0 |
| Ethylene glycol phenyl ether[1] | 6.76 | 6.76 | 6.76 |
| Ethylene glycol n-butyl ether | 7.79 | 7.79 | 7.79 |
| $C_{12}$-$C_{18}$ fatty alcohol ethoxylate | 0.28 | 0.28 | 0.28 |

[1]DOWANOL ™ EPh from Dow Chemical Co.

The Run 5-1, 5-2 and 5-3 concentrates respectively had MEA:CSA molar ratios of 1.5:1, 1.25:1, and 1.05:1. Each concentrate was mixed with water at a 1:3 by volume dilution rate. The pH of each of the resulting use-solutions was measured using a pH meter. The use-solutions were used to strip a linoleum tile coated with 1 coat of uncrosslinked TUKLAR Medical floor finish followed by 2 coats of aziridine crosslinked TUKLAR MEDICAL floor finish. Each floor finish coat had been applied at a 50 m²/L (2000 ft²/gallon) coating rate. Using the method of Example 2, a ring test was employed to evaluate stripping effectiveness at 5 min, 10 min and 15 min contact times. Linoleum staining was visually evaluated to determine if "browning" occurred at the tile surface. As shown below in Table 5b, all three stripper/cleaners effectively stripped the finish, with varying degrees of linoleum staining depending on the pH. Slight staining was observed below pH 9 and no staining was observed below pH 8.

TABLE 5b

|  | Run 5-1 | Run 5-2 | Run 5-3 |
|---|---|---|---|
| Use-solution pH | 9.37 | 8.99 | 7.96 |
| % Finish Removal, contact time: | | | |
| 5 min | 100 | 100 | 100 |
| 10 min | 100 | 100 | 100 |
| 15 min | 100 | 100 | 100 |
| Staining | Yes | Slight | No |

Example 6

A series of concentrates (Run 6-2 through Run 6-7) containing varying amounts of diethyl ethanolamine (DEEA) was made by mixing together the ingredients in the percentage amounts shown below in Table 6a. Table 6a also shows the Run 4-2 concentrate and an additional concentrate (Run 6-1) made using MEA as the amine.

As shown in Table 6b, the DEEA-containing stripper/cleaner formulations tended to provide better stripping at a pH from 2.5 to neutral and when 2 phases were formed upon standing. The Run 6-2 and 6-3 formulations provided stripping performance comparable to that of the MEA-containing stripper/cleaner formulation in Run 6-1, but at a much lower pH.

Example 7

Two ready-to-use stripper/cleaners were made from the ingredients shown below in Table 7. The first four ingredients were added in the order listed and mixed. The next two ingredients were mixed together, then added to the mixture of the first four ingredients and stirred until a homogenous mixture was obtained.

TABLE 6a

| Ingredient | Run 4-2, % | Run 6-1, % | Run 6-2, % | Run 6-3, % | Run 6-4, % | Run 6-5, % | Run 6-6, % | Run 6-7, % |
|---|---|---|---|---|---|---|---|---|
| Water | 22.18 | 4.98 | 4.98 | 4.53 | 3.53 | 22.18 | 21.18 | 20.58 |
| Monoethanolamine | 10.32 | 3.68 | | | | | | |
| Diethyl ethanolamine | | | 3.68 | 4.13 | 5.13 | 10.32 | 11.32 | 11.92 |
| Benzyl alcohol | 39.0 | 68.25 | 68.25 | 68.25 | 68.25 | 39.0 | 39.0 | 39.0 |
| $C_{12}$-$C_{18}$ fatty alcohol ethoxylate | 0.3 | 0.53 | 0.53 | 0.53 | 0.53 | 0.3 | 0.3 | 0.3 |
| Ethylene glycol n-butyl ether | 9.0 | 15.0 | 15.0 | 15.0 | 15.0 | 9.0 | 9.0 | 9.0 |
| Cumene sulfonic acid | 19.2 | 6.82 | 6.82 | 6.82 | 6.82 | 19.2 | 19.2 | 19.2 |

The resulting floor stripper/cleaner concentrates were mixed with water at a 1:3 (Run 4-2, Run 6-5, Run 6-6 and Run 6-7) or 1:6 (Run 6-1, Run 6-2, Run 6-3 and Run 6-4) volume dilution ratio. The use-solutions were used to strip tiles coated as in Example 1 with 2 layers of crosslinked floor finish, and evaluated using a ring test and 5, 10 and 15 minute contact times as in Example 2. The use-solution pH values were determined using pH strips. Stripping performance was evaluated using a 1 (worst) to 6 (best) scale with 1 representing no stripping and 6 representing complete stripping. The results are shown below in Table 6b. The number of phases in each use-solution was determined by stirring the use-solution until the ingredients were well mixed, then allowing the use-solution to stand for 2-3 visually examining the solution without agitation to determine if any phase separation could be observed.

TABLE 7

| Ingredient | Run 7-1, % | Run 7-2, % |
|---|---|---|
| Water | 89.4 | 89.4 |
| Cumene sulfonic acid | 1.3 | 1.3 |
| Ammonium hydroxide | 0.7 | |
| Monoethanolamine | | 0.7 |
| Benzyl alcohol | 7.6 | 7.6 |
| Linear alcohol ethoxylate[1] | 1.0 | 1.0 |

[1]SURFONIC ™ L24-4 from Huntsman Performance Products.

Both stripper/cleaners were used to strip a tile coated as in Example 1 with 2 layers of crosslinked floor finish, and evaluated by dividing the tile in half and applying 6 milliliters of the Run 7-1 stripper/cleaner to one half and 6 milliliters of the TABLE 6b

|  | Run 4-2 | Run 6-1 | Run 6-2 | Run 6-3 | Run 6-4 | Run 6-5 | Run 6-6 | Run 6-7 |
|---|---|---|---|---|---|---|---|---|
| Use-solution pH | 10 | 10 | 2.5 | Neutral | 9 | 2 | Neutral | 9 |
| Finish Removal Rating (1-6 Scale), contact time: | | | | | | | | |
| 5 min | 1 | 4 | 4 | 4 | 1 | 1 | 0 | 0 |
| 10 min | 2 | 5 | 5 | 5 | 3 | 2 | 0 | 1 |
| 15 min | 3 | 6 | 6 | 6 | 4 | 3 | 1 | 1 |
| No. of Phases in Use-solution | 1 | 2 | 2 | 2 | 2 | 1 | 1 | 1 |

Run 7-2 stripper/cleaner to the other half. Both stripper/cleaners were evenly distributed using a green flocked pad. An additional 6 milliliters of each stripper/cleaner was similarly applied after 2, 4 and 8 minutes total contact time. After 15 minutes total contact time, the tiles were scrubbed by hand using a green SCOTCHBRITE pad and rinsed with water. Both stripper/cleaners were effective at removing finish in contact with the stripper/cleaner. However, the Run 7-1 stripper/cleaner (which contained ammonium hydroxide) was observed to dewet significantly throughout the experiment, despite repeated application of additional stripper/cleaner. Accordingly the stripped areas were small and localized when the Run 7-1 stripper/cleaner was used. The Run 7-2 effectively wet the entire finish surface and stripped the entire tested area.

Example 8

A series of floor stripper/cleaner concentrates was made from a variety of organic acids by missing together the ingredients shown below in Table 8a.

TABLE 8a

| Ingredient | Run 8-1, % | Run 8-2, % | Run 8-3, % | Run 8-4, % | Run 8-5, % | Run 8-6, % |
|---|---|---|---|---|---|---|
| Water | 38.17 | 38.17 | 38.17 | 38.17 | 38.17 | 38.17 |
| Benzyl alcohol | 27.0 | 27.0 | 27.0 | 27.0 | 27.0 | 27.0 |
| Ethylene glycol phenyl ether | 6.76 | 6.76 | 6.76 | 6.76 | 6.76 | 6.76 |
| Toluene sulfonic acid[1] | 15.12 | | | | | |
| Modified toluene sulfonic acid[2] | | 15.12 | | | | |
| Xylene sulfonic acid[3] | | | 15.12 | | | |
| Methyl naphthalene sulfonic acid[4] | | | | 15.12 | | |
| Sulfosuccinic acid[5] | | | | | 15.12 | |
| Hydroxyethane sulfonic acid[6] | | | | | | 15.12 |
| Monoethanolamine | 4.88 | 4.88 | 4.88 | 4.88 | 4.88 | 4.88 |
| Ethylene glycol n-butyl ether | 7.79 | 7.79 | 7.79 | 7.79 | 7.79 | 7.79 |
| $C_{12}$-$C_{18}$ fatty alcohol ethoxylate | 0.28 | 0.28 | 0.28 | 0.28 | 0.28 | 0.28 |

[1]TSA-95 from Rutgers Organics Corp.
[2]WITCONIC ™ TX from Akzo Nobel Chemicals.
[3]XSA-90 from Rutgers Organics Corp.
[4]WITCONIC AN from Akzo Nobel Chemicals.
[5]TEGOKAT ™ S70 from Goldschmidt Industrial Chemical Corp.
[6]TEGO ™ HES70 from Goldschmidt Industrial Chemical Corp.

The resulting floor stripper/cleaner concentrates were mixed with water at a 1:3 volume dilution ratio. The use-solutions were used to strip tiles coated as in Example 5 with 1 layer of uncrosslinked floor finish and 2 layers of crosslinked floor finish, and evaluated using a ring test and 5, 10 and 15 minute contact times as in Example 2. The use-solution pH values were determined using a pH meter. Stripping performance and linoleum staining were evaluated as in Example 5. The results are shown below in Table 8b.

TABLE 8b

| | Run 8-1 | Run 8-2 | Run 8-3 | Run 8-4 | Run 8-5 | Run 8-6 |
|---|---|---|---|---|---|---|
| Concentrate Appearance | Clear Solution | Clear Solution | Clear Solution | Orange Emulsion | Milky Emulsion | Milky Emulsion |
| Use solution Appearance | Unstable emulsion | Unstable emulsion | Unstable emulsion | Unstable emulsion | Unstable emulsion | Unstable emulsion |
| Use-solution pH | 2.05 | 2.35 | 7.81 | 9.17 | 3.62 | 2.33 |
| % Finish Removal, contact time: | | | | | | |
| 5 min | 100 | 100 | 100 | 100 | 100 | 100 |
| 10 min | 100 | 100 | 100 | 100 | 100 | 100 |
| 15 min | 100 | 100 | 100 | 100 | 100 | 100 |
| Staining | No | No | No | Yes | No | No |

As shown in Table 8b, all of the use-solutions formed unstable emulsions but completely stripped the finish. Linoleum staining was observed for the Run 8-3 stripper/cleaner, which had a pH greater than 9.

Example 9

Using the method of Example 8, a series of floor stripper/cleaner concentrates was made from a variety of organic acids by missing together the ingredients shown below in Table 9a.

TABLE 9a

| Ingredient | Run 9-1, % | Run 9-2, %: | Run 9-3, % | Run 9-4, % | Run 9-5, % | Run 9-6, % |
|---|---|---|---|---|---|---|
| Water | 74.49 | 74.49 | 74.49 | 74.49 | 74.49 | 74.49 |
| Ethylene glycol phenyl ether | 11.4 | 11.4 | 11.4 | 11.4 | 11.4 | 11.4 |
| Toluene sulfonic acid | 3.51 | | | | | |
| Modified toluene sulfonic acid | | 3.51 | | | | |
| Xylene sulfonic acid | | | 3.51 | | | |
| Methyl naphthalene sulfonic acid | | | | 3.51 | | |
| Sulfosuccinic acid | | | | | 3.51 | |
| Hydroxyethane sulfonic acid | | | | | | 3.51 |
| Monoethanolamine | 2.1 | 2.1 | 2.1 | 2.1 | 2.1 | 2.1 |
| Ethylene glycol n-butyl ether | 4.5 | 4.5 | 4.5 | 4.5 | 4.5 | 4.5 |
| $C_{12}$-$C_{18}$ fatty alcohol ethoxylate | 4.0 | 4.0 | 4.0 | 4.0 | 4.0 | 4.0 |

The resulting floor stripper/cleaner concentrates were mixed with water at a 1:3 volume dilution ratio. The use-solutions were used to strip tiles coated with 5 layers of GEMSTAR LASER™ floor finish (from Ecolab Inc.) which had been applied at a 50 m²/L (2000 ft²/gallon) coating rate, and evaluated using a ring test and 5, 10 and 15 minute contact times as in Example 2. The use-solution pH values were determined using a pH meter. Stripping performance was evaluated as in Example 5. The results are shown below in Table 9b.

TABLE 9b

|  | Run 9-1 | Run 9-2 | Run 9-3 | Run 9-4 | Run 9-5 | Run 9-6 |
|---|---|---|---|---|---|---|
| Concentrate Appearance | Milky emulsion | Milky emulsion | Clear solution | Clear orange solution | Milky emulsion | Milky emulsion |
| Use solution Appearance | Unstable emulsion | Unstable emulsion | Unstable emulsion | Clear orange solution | Unstable emulsion | Unstable emulsion |
| Use-solution pH | 9.33 | 9.39 | 9.43 | 9.64 | 5.76 | 9.34 |
| % Finish Removal, contact time: |  |  |  |  |  |  |
| 5 min | 99 | 25 | 40 | 40 | 0 | 25 |
| 10 min | 100 | 40 | 75 | 75 | 5 | 100 |
| 15 min | 100 | 75 | 100 | 75 | 5 | 100 |

The Run 9-5 stripper/cleaner provided less stripping than the other formulations but also had a much lower pH. Raising the pH to about 7-10 for use on vinyl composite tiles or to about 7-9 for use on linoleum should improve the stripping performance of this formulation.

Example 10

A series of ready-to-use stripper/cleaners were made using a variety of amines in the amounts shown below in Table 10a. The Run 10-4 stripper/cleaner was made by adding one drop of MEA to 14.9 g of the Run 10-1 stripper/cleaner.

TABLE 10

| Ingredient | Run 10-1, % | Run 10-2, % | Run 10-3, % | Run 10-4, % |
|---|---|---|---|---|
| Water | 90.76 | 90.76 | 90.76 | ~90.46 |
| Cumene sulfonic acid | 1.32 | 1.32 | 1.32 | ~1.32 |
| Linear alcohol ethoxylate[1] | 0.54 | 0.54 | 0.54 | ~0.54 |
| N-benzylethanolamine | 7.38 |  |  | ~7.36 |
| Furfurylamine |  | 7.38 |  |  |
| Tetrahydrofurfurylamine |  |  | 7.38 |  |
| Monoethanolamine |  |  |  | ~0.31 |

[1]SURFONIC L12-8 from Huntsman Performance Products.

The pH of the each of the resulting use-solutions was determined using a pH meter. The use-solutions were used to strip tiles coated with 5 layers of GEMSTAR LASER™ floor finish applied at a 50 m$^2$/L (2000 ft$^2$/gallon) coating rate or 5 layers of ISI STAR™ floor finish (from Ecolab Inc.) applied at a 50 m$^2$/L (2000 ft$^2$/gallon) coating rate. After approximately 1 month at room temperature conditions sitting undisturbed, the tiles were burnished with an ultra high speed (UHS) burnishing machine equipped with a 3M 4100 White Super Polish pad and operated using 4 back and forth passes. Several drops of each of the above use-solutions were applied to 25 mm×25 mm square sections cut from the tiles, and allowed to stand for 7 minutes or 13 minutes. After the standing time had elapsed, the stripper/cleaners were poured off the tile sections and the sections were submerged in water for several seconds. Each tile section was then removed from the water and gently rubbed with a paper towel to remove any loose finish. The results are shown below in Table 10b.

TABLE 10b

|  | Run 10-1 | Run 10-2 | Run 10-3 | Run 10-4 |
|---|---|---|---|---|
| Use pH | 9.69 | 10.07 | 10.66 | 9.88 |
| 7 min result on GEMSTAR LASER finish | Film softened, top layers removed | Film softened, top layers removed | Top layers softened and somewhat wiped off | 80-90% removed |
| 13 min result on GEMSTAR LASER finish | 60-70% removed | 95% removed | Top layers softened and somewhat wiped off | 100% removed |
| 7 min result on ISI STAR finish | ~50% removed | 90% removed | Top layer softened | Almost 100% removed |
| 13 min result on ISI STAR finish | ~30% removed | 95% removed | Top layers removed | Almost 100% removed |

As shown in Table 10b, the Run 10-4 stripper/cleaner provided especially effective stripping on both GEMSTAR LASER and ISI STAR finishes.

Example 11

A series of ready-to-use stripper/cleaners were made using the ingredients and amounts shown below in Table 11a.

TABLE 11a

| Ingredient | Run 11-1, % | Run 11-2, % | Run 11-3, % | Run 11-4, % | Run 11-5, % | Run 11-6, % | Run 11-7, % |
|---|---|---|---|---|---|---|---|
| Water | 92.88 | 92.32 | 92.8 | 92.82 | 90.89 | 92.75 | 92.75 |
| Benzyl alcohol | 7.0 | 6.96 | 7.0 | 7.0 | 6.85 | 7.0 | 7.0 |
| Monoethanolamine | 0.07 | 0.07 | 0.07 |  |  | 0.07 | 0.07 |
| Cumene sulfonic acid |  |  | 0.13 | 0.13 | 0.13 | 0.13 |  |
| Xylene sulfonic acid |  |  |  |  |  |  | 0.13 |
| Linear alcohol ethoxylate[1] | 0.05 | 0.05 |  | 0.05 | 0.05 | 0.05 | 0.05 |
| Sodium bicarbonate (NaHCO) |  | 0.60 |  | 2.08 |  |  |  |

[1]SURFONIC L12-8 from Huntsman Performance Products.

The pH of each of the resulting use-solutions was determined using a pH meter. The use-solutions were used to strip tiles coated with 2 layers of a standard acrylic finish basecoat and 1 coat of ORION two-part urethane topcoat applied at a 15 m$^2$/L (600 ft$^2$/gallon) coating rate. The stripper/cleaners were applied for various contact times with results shown below in Table 11b.

TABLE 11b

|  | Run 11-1 | Run 11-2 | Run 11-3 | Run 11-4 | Run 11-5 | Run 11-6 | Run 11-7 |
|---|---|---|---|---|---|---|---|
| Use-solution pH | 11.31 | 9.3 | 9.71 | 1.37 | 8.3 | 9.76 | 9.48 |
| Finish removal, contact time: | | | | | | | |
| 4 min. | | | | | No effect | | |
| 5 min. | 5% puckered | No effect | ~50% removed | Puckered film ~10% removed | No effect | ~25% removed | ~60% removed |
| 6 min. | ~20% removed | Puckered film | | | | | |
|  | 25% removed | | | | | | |
| 9 min. | 100% removed | 60% removed | | 25% removed | Puckered film, top layers removed | | |
| 10 min. | 100% Removed | | 80% removed | 20% removed | | 90% removed | 75% removed |
| 15 min. | 100% removed | | 80% removed | 40% removed | | 100% removed | 60% removed |
| 20 min. | 100% removed | | 75% removed | 50% removed | | 100% removed | 90% removed |

Example 12

A floor stripper/cleaner concentrate was made using the ingredients and amounts shown below in Table 12.

TABLE 12

| Ingredient | Run 12-1, % |
|---|---|
| Water | 64.43 |
| Monoethanolamine | 1.3 |
| Cumene sulfonic acid | 3.84 |
| Propylene glycol n-butyl ether | 5.75 |
| Sodium alkyl ether sulfate, 4 EO[1] | 4.0 |
| $C_{9-11}$ alcohol ethoxylate[2] | 6.0 |
| Ethylene glycol phenyl ether | 13.8 |
| Potassium hydroxide | 0.58 |
| Blend of sulfonated surface active ingredients and poly alkylene glycols[3] | 0.3 |

[1]TEXAPON ™ K14S from Cognis Deutschland, GmbH.
[2]BEROL ™ 260 from Akzo Nobel Europe.
[3]FOAMSTOP ™ 600 from ADD APT Chemicals.

The concentrate formula was diluted 1:3 by volume with water and used to strip up to and including 6 coats of GEMSTAR LASER floor finish in a single application.

Example 13

A floor stripper/cleaner concentrate was made using the ingredients and amounts shown below in Table 13a.

TABLE 13a

| Ingredient | Amount, % |
|---|---|
| Water | 74.5 |
| Monoethanolamine | 2.1 |
| Cumene sulfonic acid | 3.51 |
| Ethylene glycol phenyl ether | 11.4 |
| Diethylene glycol monobutyl ether[1] | 4.5 |
| Linear alcohol ethoxylate[2] | 4.0 |

[1]Butyl CARBITOL from Dow Chemical Co.
[2]SURFONIC L24-4 from Huntsman Performance Products.

The resulting floor stripper/cleaner concentrate was mixed with water at a 1:3 volume dilution ratio. A comparison use-solution was prepared by mixing CARE STRIP LOW ODOR™ stripper concentrate from Ecolab Inc. with water at a 1:8 volume dilution ratio to for a use-solution having a pH of 13.5. The use-solutions were used to strip tiles coated with 4 layers of ZINC FREE FLOOR FINISH or 4 layers of GEMSTAR LASER™ floor finish (both from Ecolab Inc.) which had been applied at a 50 m²/L (2000 ft²/gallon) coating rate, and evaluated using a ring test and 5 and 10 minute contact times as in Example 2. Stripping performance was evaluated as in Example 5. The results are shown below in Table 13b.

TABLE 13b

|  | FLOOR FINISH | | | |
|---|---|---|---|---|
|  | ZINC FREE FLOOR FINISH | | GEMSTAR LASER | |
|  | 5 minute contact time | 10 minute contact time | 5 minute contact time | 10 minute contact time |
| Example 13 Floor Stripper/ Cleaner | 75-100% Removal | 75-100% Removal | 10-25% Removal | 50-75% Removal |
| CARE STRIP LOW ODOR Floor Stripper | 75-100% Removal | 75-100% Removal | 25-50% Removal | 50-75% Removal |

The Example 13 floor stripper/cleaner provided comparable stripping performance to CARE STRIP LOW ODOR floor stripper, but employed a much less caustic formulation.

The Example 13 floor stripper cleaner was also used to strip a tile floor using a swing machine equipped with a 3M HI PRO™ black nonwoven pad, and successfully removed using an autoscrubber. No dewetting was observed and minimal foam formation occurred.

Example 14

Three floor stripper/cleaner concentrates were made using the ingredients and amounts shown below in Table 14a:

TABLE 14a

| Ingredient | Run 14-1, % | Run 14-2, % | Run 14-3, % |
|---|---|---|---|
| Water | 73.8 | 62.1 | 58.5 |
| Monoethanolamine | 2.5 | 9.6 | |
| Triethanolamine (85%) | | | 20 |
| Cumene sulfonic acid | 5.7 | | |

TABLE 14a-continued

| Ingredient | Run 14-1, % | Run 14-2, % | Run 14-3, % |
|---|---|---|---|
| Lactic acid | | 9.4 | |
| Ethylene glycol phenyl ether | 10.0 | 3.5 | 5.0 |
| Diethylene glycol monobutyl ether | 6.0 | 4.6 | 6.0 |
| Sodium xylene sulfonate | | 9.8 | |
| Propylene glycol | | | 10 |
| Linear alcohol ethoxylate[1] | 2.0 | | |
| Linear alcohol ethoxylate[2] | | 1.0 | 0.5 |

[1]SURFONIC L12-6 from Huntsman Performance Products.
[2]SURFONIC L24-7 from Huntsman Performance Products.

The concentrates were tested with the CORROSITEX™ in-vitro skin corrosion assay from InVitro International. In this assay, a color-changing fluid is placed beneath a biomembrane which provides a color change signal when a corrosive material degrades the membrane. Materials are considered corrosive if they break through the membrane in less than sixty minutes of contact. The assay uses a sodium hydroxide solution as a negative control. The assay results are shown below in Table 14b.

TABLE 14b

| Formulation | Concentrate pH | Skin Corrosion Assay Result |
|---|---|---|
| Run 14-1 | 9.5 | NOT CORROSIVE (Not DOT Regulated) |
| Run 14-2 | 10.0 | CORROSIVE (DOT Packing group III) |
| Run 14-3 | 9.5 | CORROSIVE (DOT Packing group III) |
| Sodium hydroxide solution | >13 | CORROSIVE (DOT Packing group II) |

As shown in Table 14b, the Run 14-1 floor stripper/cleaner was not corrosive in the skin corrosion assay, and could be shipped without requiring DOT-approved packaging.

Example 15

A floor stripper/cleaner concentrate was made using the ingredients and amounts shown below in Table 15a:

TABLE 15a

| Ingredient | Amount, % |
|---|---|
| Water | 61.6 |
| Cumene sulfonic acid | 5.9 |
| Monoethanolamine | 1.3 |
| Propylene glycol monobutyl ether | 5.8 |
| Lauryl ether sulfate | 4.0 |
| $C_{9-11}$ alcohol ethoxylate[1] | 6.0 |
| Phenoxyethanol | 13.8 |
| Potassium hydroxide (45%) | 1.3 |
| Blend of sulfonated surface active ingredients and poly alkylene glycols[2] | 0.3 |

[1]BEROL 260 from Akzo Nobel Europe.
[2]FOAMSTOP 600 from ADD APT Chemicals.

The resulting concentrate was mixed with water at a 1:99 volume dilution ratio to make a light duty cleaning solution, at a 1:19 volume dilution ratio to make a heavy duty cleaning solution, at a 1:9 volume dilution ratio to make a pH test solution and at a 1:3 volume dilution ratio to make a floor stripper use-solution. The pH test solutions were measured using a pH meter. Comparison light duty cleaning, heavy duty cleaning, pH test and floor stripper use-solutions were prepared by mixing BENDUROL FORTE™ or SIGOFIX ULTRA™ concentrates (both from Ecolab Inc.) with water at the same 1:99, 1:19, 1:9 and 1:3 volume dilution ratios, and applying the use-solutions to beige tiles coated with 5 layers of GEMSTAR LASER floor finish which had been applied at a 25 L/m² (1000 ft²/gallon) coating rate and aged for approximately four weeks. The cleaning solutions were numerically evaluated for cleaning efficacy by measuring the lightness value lightness value (L*) of the coated tiles using a color spectrophotometer, soiling the tiles in a soiling drum using a test soil (containing 7 wt. % carbon black, 17 wt. % MYRITOL™ oil from Cognis Corp., 40 wt. % process oil and 36 wt. % benzin 80/110 solvent), remeasuring to determine the loss in lightness value due to soiling, cleaning the soiled tiles using a Gardner scrub machine (from the Paul N. Gardner Co.) whose scrub brush had been saturated with the cleaning solution, and measuring again to determine the percent of recovered lightness value. The floor stripper use-solutions were subjectively evaluated to determine stripping performance by saturating the Gardner scrub brush with the floor stripper use-solution and scrubbing the tiles for 5 minutes, then rinsing to remove residual floor stripper/cleaner and finish. The results are shown below in Table 15b.

TABLE 15b

| | | Performance | | |
|---|---|---|---|---|
| Formulation | 1:9 Use-Solution pH | 1:99 Light Duty Cleaning Solution | 1:19 Heavy Duty Cleaning Solution | 1:2 Floor Stripper/Cleaner |
| Example 15 Formulation | 9.5 | 50 | 62 | Complete (not slippery) |
| BENDUROL FORTE floor stripper | 9.5 | 28 | 48 | Incomplete (very slippery) |
| SIGOFIX ULTRA floor stripper | 12.8 | 36 | 55 | Complete (not slippery) |

The Example 15 formulation demonstrated exceptional cleaning and stripping performance, even at a relatively mild pH. This may be better appreciated by comparing the Example 15 Table 15b results to those obtained using BENDUROL FORTE floor stripper. The Example 15 formulation provided light duty and heavy duty cleaning results that respectively were nearly double and more than 20% better than those obtained for BENDUROL FORTE floor stripper. Additionally, the Example 15 Floor stripping results were significantly better than those obtained using BENDUROL FORTE floor stripper. The Example 15 formulation cleaning and stripping performance was also at least as good as or better than the performance obtained using SIGOFIX ULTRA floor stripper, which has a much higher pH.

Example 16

Six floor stripper/cleaner concentrates were made using the ingredients and amounts shown below in Table 16a.

TABLE 16a

| Ingredient | Run 16-1, % | Run 16-2, % | Run 16-3, % | Run 16-4, % | Run 16-5, % | Run 16-6, % |
|---|---|---|---|---|---|---|
| Water | 74.49 | 75.22 | 75.69 | 74.49 | 72.31 | 74.32 |
| Ethylene glycol phenyl ether | 11.4 | 11.4 | 11.4 | 11.4 | 11.4 | 11.4 |

TABLE 16a-continued

| Ingredient | Run 16-1, % | Run 16-2, % | Run 16-3, % | Run 16-4, % | Run 16-5, % | Run 16-6, % |
|---|---|---|---|---|---|---|
| Benzoic acid | 3.51 | 2.78 | | | | |
| 2-Hydroxybenzoic acid | | | 2.30 | | | |
| 3,5-Dihydroxybenzoic acid | | | | 3.51 | | |
| 2,6-pyridinedicarboxylic acid | | | | | 3.80 | |
| Linear alkylbenzenesulfonic acid[1] | | | | | | 3.50 |
| Monoethanolamine | 2.1 | 2.1 | 2.1 | 2.1 | 4.49 | 2.30 |
| Diethylene glycol monobutyl ether | 4.5 | 4.5 | 4.5 | 4.5 | 4.4 | 4.49 |
| Linear alcohol ethoxylate[2] | 4.0 | 4.0 | 4.0 | 4.0 | 3.9 | 3.99 |

[1]BIOSOFT ™ S-101 from Stepan Chemical Co.
[2]SURFONIC L24-4 from Huntsman Performance Products.

The pH of each concentrate was measured using pH strips. Each concentrate was diluted 1:3 by volume with water to provide a diluted use-solution. 7.5 Milliliter portions of the Run 16-1 and Run 16-6 use-solutions were placed in a 50 ml Erlenmeyer flask, manually shaken for one minute and allowed to stand for one minute. The Run 16-1 use-solution produced approximately 2.5 ml of foam (viz., a foam volume corresponding to about one third of the initial liquid volume). The Run 16-6 use-solution produced a heavy foam that filled the remaining volume (approximately 42.5 mL) in the flask. This foam slowly collapsed but after five additional minutes of standing time approximately half the remaining volume in the flask was filled with foam.

A commercial floor stripper (CARESTRIP LOW ODOR™, from Ecolab Inc.) was diluted 1:6 by volume with water to provide a comparison use-solution. Each concentrate and use-solution was visually evaluated for phase separation. The use-solutions were used to strip standard vinyl composite tiles coated with 3 layers of ISI STAR floor finish which had been applied at a 50 m²/L (2000 ft²/gallon) coating rate and aged in a 50° C. oven for 1 week. Stripping was performed using a ring test and a 5 minute contact time as in Example 2 and two stripping tests per use-solution. Stripping performance was evaluated as in Example 5. The results are shown below in Table 16b.

TABLE 16b

| | CARESTRIP LOW ODOR | Run 16-1 | Run 16-2 | Run 16-3 | Run 16-4 | Run 16-5 | Run 16-6 |
|---|---|---|---|---|---|---|---|
| Concentrate pH | 12 | 8.5 | 9 | 9 | 9 | 9 | 9 |
| Concentrate Phases | 1 | 2 | 2 | 2 | 2 | 2 | 1 |
| Use solution Phases | 1 | 2 | 2 | 2 | 2 | 2 | 1 |
| % Finish Removal, contact time: | | | | | | | |
| 5 min | 100 | 75 | 100 | 100 | 100 | 100 | 100 |

As shown in table 16b, each of the acids in Table 16a could be used to prepare a relatively low pH floor stripper/cleaner that removed ISI STAR finish as effectively as a commercially available pH 12 floor stripper.

Example 17

The dilute hydrophobic soil cleaner shown in Table A of U.S. Pat. No. 5,744,440 was replicated and evaluated to determine foam generation using the method of Example 16. A 7.5 mL portion of the cleaner was placed in a 50 ml Erlenmeyer flask, manually shaken for one minute and allowed to stand for one minute. The cleaner produced a heavy foam that filled the remaining volume (approximately 42.5 mL) in the flask. A similar foam generation test was performed using the Run 6-1 and Example 13a concentrates, each diluted 1:3 by volume with water. The Run 6-11 use-solution produced approximately 5 ml of foam (viz., a foam volume corresponding to about two thirds of the initial liquid volume), and the Run 13 use-solution produced approximately 7.5 mL of foam (viz., a foam volume corresponding to the initial liquid volume). In each case the Run 6-11 and Run 13 use-solutions produced less than 10 mL of foam (viz., less than ⅔ the initial liquid volume).

Various modifications and alterations of this invention will be apparent to those skilled in the art without departing from the scope and spirit of this invention. It should be understood that this invention is not limited to the illustrative embodiments set forth above.

We claim:

1. A floor finish stripper or scrub and recoat composition comprising:
   a) sparingly water-soluble floor finish solvent;
   b) water;
   c) nonethoxylated coupler consisting of toluene, xylene, or cumene sulfonic acid or mixtures thereof, in an amount sufficient to provide a homogenous aqueous liquid phase and no or low foaming during shaking, said coupler and said solvent present in a weight ratio of 1:2 to 1:6;
   d) an acid:amine molar equivalent ratio of 0.7:1 to about 1.3:1; and
   e) wherein said composition is substantially free of alkaline earth sulfonates.

2. A composition according to claim 1 wherein the solvent comprises a dibasic ester, essential oil, dialkyl carbonate or mixture thereof.

3. A composition according to claim 1 wherein the solvent comprises ethylene glycol monobutyl ether, diethylene glycol monobutyl ether, ethylene glycol phenyl ether, propylene glycol phenyl ether, or mixture thereof.

4. A composition according to claim 1 wherein the solvent comprises benzyl alcohol.

5. A composition according to claim 1 wherein the amine comprises monoethanolamine.

6. A composition according to claim 1 further comprising surfactant.

7. A composition according to claim 1 having a pH of about 4 to about 10.

8. A composition according to claim 1 having a pH of about 5 to about 9.

9. A composition according to claim 1 in the form of a single phase mixture.

10. A composition according to claim 1 that is not corrosive to skin.

11. A composition according to claim 1 comprising about 5 to about 85 wt. % solvent, about 1 to about 93 wt. % water, about 1 to about 25 wt. % acid coupler and about 1 to about 25 wt. % organic amine.

12. A method for stripping or deep scrubbing a floor finish comprising:
   a) applying to the floor finish a composition consisting essentially of sparingly water-soluble floor finish solvent; water; nonethoxylated coupler consisting of toluene, xylene, cumene sulfonic acid or mixtures thereof, in an amount sufficient to provide a homogenous aqueous liquid phase and no or low foaming during shaking said coupler and said solvent present in a weight ratio of 1:2 to 1:6; and an acid:amine molar equivalent ratio of about 0.7:1 to about 1.3:1;
   b) allowing the applied composition to soften, dissolve or clean the floor finish; and
   c) removing the composition.

13. A method according to claim 12 wherein the solvent comprises a dibasic ester, essential oil, dialkyl carbonate or mixture thereof.

14. A method according to claim 12 wherein the solvent comprises ethylene glycol monobutyl ether, diethylene glycol monobutyl ether, ethylene glycol phenyl ether, propylene glycol phenyl ether, or mixture thereof.

15. A method according to claim 12 wherein the solvent comprises benzyl alcohol.

16. A method according to claim 12 wherein the amine comprises monoethanolamine.

17. A method according to claim 12 further comprising surfactant.

18. A method according to claim 12 having a pH of about 4 to about 10.

19. A method according to claim 12 having a pH of about 5 to about 9.

20. A method according to claim 12 in the form of a single phase mixture.

21. A method according to claim 12 that is not corrosive to skin.

22. A method according to claim 12 comprising 0.05 to about 25 wt. % solvent, about 25 to about 99 wt. % water, about 0.1 to about 10 wt. % acid coupler and about 0.1 to about 10 wt. % organic amine.

* * * * *